United States Patent [19]
Ching et al.

[11] Patent Number: 5,944,358
[45] Date of Patent: Aug. 31, 1999

[54] REVERSIBLE EJECTOR TEE

[75] Inventors: Fred Y. F. Ching, Canyon Country; Authur C. Inocelda, Newhall, both of Calif.

[73] Assignee: Emhart Inc., Newark, Del.

[21] Appl. No.: 08/979,773

[22] Filed: Nov. 26, 1997

[51] Int. Cl.⁶ .................................................. F16L 25/00
[52] U.S. Cl. ............................... 285/12; 285/39; 285/93; 285/125.1; 137/119.05; 137/270; 137/597
[58] Field of Search ..................... 285/12, 125.1, 285/39, 93; 137/119.05, 270, 597; 4/570, 675, 676, 677, 678, DIG. 4

[56]   References Cited
   U.S. PATENT DOCUMENTS

| | | |
|---|---|---|
| 1,653,956 | 12/1927 | Glauber . |
| 1,777,434 | 10/1930 | Herzbrun . |
| 2,152,868 | 4/1939 | Bucknell et al. . |
| 2,297,533 | 9/1942 | Brotz . |
| 2,410,912 | 11/1946 | Wenk ................................ 285/125.1 X |
| 2,769,454 | 11/1956 | Bletcher et al. . |
| 3,012,251 | 12/1961 | Fife . |
| 3,886,638 | 6/1975 | Hayman et al. . |
| 4,899,397 | 2/1990 | Crawford et al. . |
| 4,997,007 | 3/1991 | Niemann et al. . |
| 5,137,048 | 8/1992 | Brattoli . |
| 5,190,077 | 3/1993 | Pawelzik .............................. 137/597 X |
| 5,806,552 | 9/1998 | Martin ..................................... 137/270 |

*Primary Examiner*—Dave W. Arola
*Attorney, Agent, or Firm*—Harold Weinstein

[57]   ABSTRACT

In a tub and shower unit, a faucet body 30 facilitates the supply of hot water and cold water either to a tub or a shower head, depending on whether a diverter valve of the unit is set in a tub mode or a shower mode. A reversible ejector tee 82 or 138 is designed for assembly with a center body 84 of the faucet body 30 to insure that hot water and cold water, which is being supplied to the faucet body, will be directed to a spout of the tub when in a tub mode without any water leaking through the shower head. The tee 82 or 138 will facilitate the directing of the water to the shower head when the diverter valve is in a shower mode. The tee 82 or 138 can be reversed in its installed position within the center body 84 to accommodate different orientations of the faucet body 30.

10 Claims, 6 Drawing Sheets

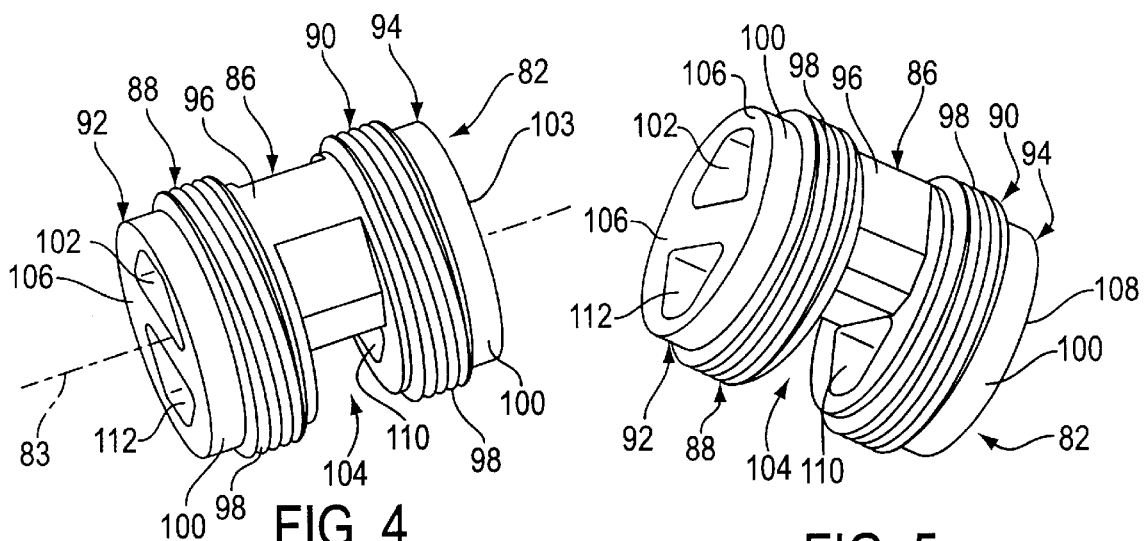
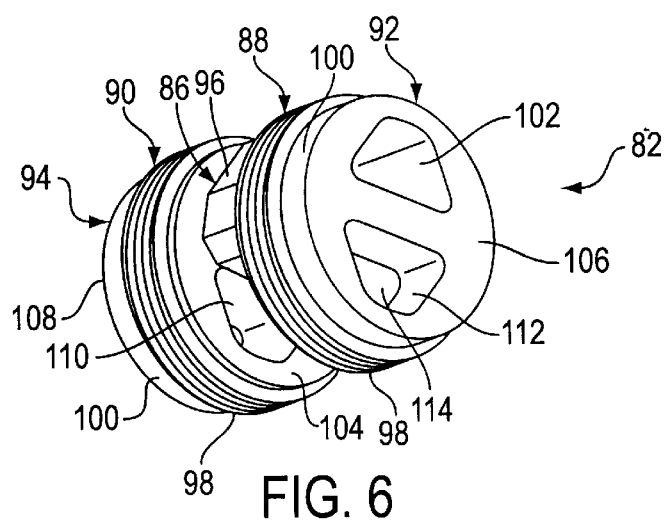
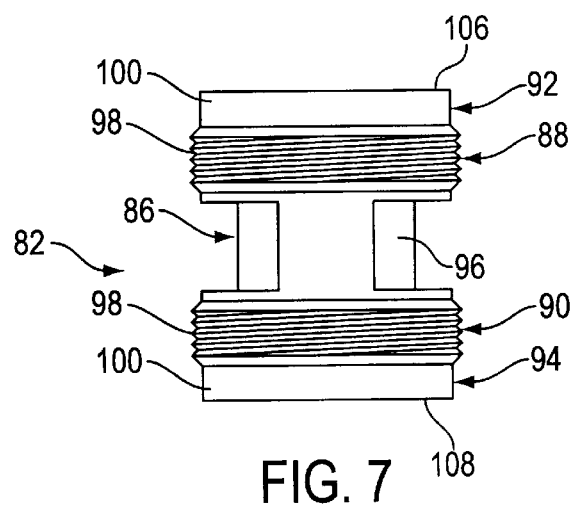

REVERSIBLE EJECTOR TEE

BACKGROUND OF THE INVENTION

This invention relates to a reversible ejector tee and particularly relates to an ejector tee which forms a reversible element of a water supply system for a tub and shower arrangement.

For many years, tub and shower systems, as well as spout and spray systems, have been installed in residential homes and institutional facilities. In the tub and shower system, water is supplied in the tub mode through a spout, and in the shower mode is supplied to a shower head. A diverter valve is typically located in the spout and can be adjusted to allow water to exit from the spout in the tub mode, or from the shower head in the shower mode.

Systems of this type typically include a hot water inlet and a cold water inlet which are coupled to two inlet ports of a center body, which is a cross-joint conduit, also having two outlet ports. The two inlet ports are typically horizontally spaced at opposite sides of the center body, while the two outlet ports are typically vertically spaced at the top and bottom thereof.

In use, hot water and cold water enters respective ones of the inlet ports of the center body, as controlled by selectively adjustable hand-operated valves located in the hot and cold supply inlet flow path. If both of the hot and cold water valves are open, hot and cold water mixes in the center body and flows through the spout or the shower head, depending on the selective positioning of the diverter valve.

In systems developed some years ago, it was noticed that when the diverter valve was positioned to direct the water through the spout and into the tub, a small amount of water would reach, and leak from, the shower head. In order to prevent the water from reaching the shower head during the tub mode, a device, referred to in some quarters as an ejector tee, was inserted into the center body to preclude water from flowing toward the shower head when the system was set for the tub mode, but allow water to flow to the shower head when the system is in the shower mode.

Typically, the center body forms a portion of an in-wall faucet body, which also includes a pair of end bodies in water-flow communication with the center body through conduits connected or formed between the end bodies and respective ones of the inlet ports of the center body. The valves are assembled with the end bodies so that the valve stems are in parallel and extend horizontally in the same direction when the faucet body is held in a prescribed orientation. The center body, end bodies and the linking conduits can be formed of individual components, or they may be formed as single casting.

In some instances when the faucet body is used in a tub and shower arrangement, the faucet body is enclosed within the space behind a wall from which the tub spout and the shower head extends. If the water supply conduits extend upward from a floor level, the faucet body is oriented in such a manner that the ejector tee assumes a prescribed vertical orientation which allows the tee to perform as intended. However, if the water supply conduits extend downward from an overhead location, the faucet body must be inverted, whereby the ejector tee is also inverted. In the inverted position, the structure of the ejector tee now directs the mixed water, undesirably, to the shower head regardless of the setting of the diverter valve.

Thus, there is a need for an ejector tee with improved structure for precluding the leaking of water from a shower head during a tub mode. There is also a need for an ejector tee, the position of which can be reversed within the center body to accommodate use of the faucet body with water supply conduits which extend toward either the bottom or the top of the body.

SUMMARY OF THE INVENTION

It is, therefore, an object of this invention to provide an ejector tee having structure for precluding the leaking of water from a shower head during a tub mode of operation.

Another object of this invention is to provide an ejector tee which can be reversed in its orientation within a center body of a faucet body to accommodate the necessary orientation of the faucet body.

With these and other objects in mind, this invention contemplates a reversible ejector tee for assembly with a faucet body. The ejector tee is formed in a generally external cylindrical shape about a longitudinal axis thereof and includes a central section which is integrally joined at opposite axial ends thereof with inboard ends of a pair of axially spaced fastening sections. Each fastening section is formed with a fastening structure about the periphery thereof. A pair of axially spaced, end sections are formed integrally at inboard ends thereof with outboard ends of the fastening sections. Outboard ends of the end sections form the outboard ends of the reversible ejector tee. A first passage is formed in an axial direction through the ejector tee, and is offset in a first axially lateral direction. A second passage is formed in an axial direction through one of the pair of fastening sections and the adjoining end section, and is offset in second axially lateral direction. A third passage is formed laterally of the axis from the exterior of the tee and is in communication with the second passage.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 4 is a perspective view showing a reversible ejector tee in accordance with certain principles of the invention;

FIG. 5 is a sectional view showing the tee of FIG. 4 in accordance with certain principles of the invention;

FIG. 6 is a perspective view showing the tee of FIG. 4 in accordance with certain principles of the invention;

FIG. 7 is a rear view showing the tee of FIG. 4 in accordance with certain principles of the invention;

DETAILED DESCRIPTION OF THE PREFERRED EMBODIMENT

Figure 1:
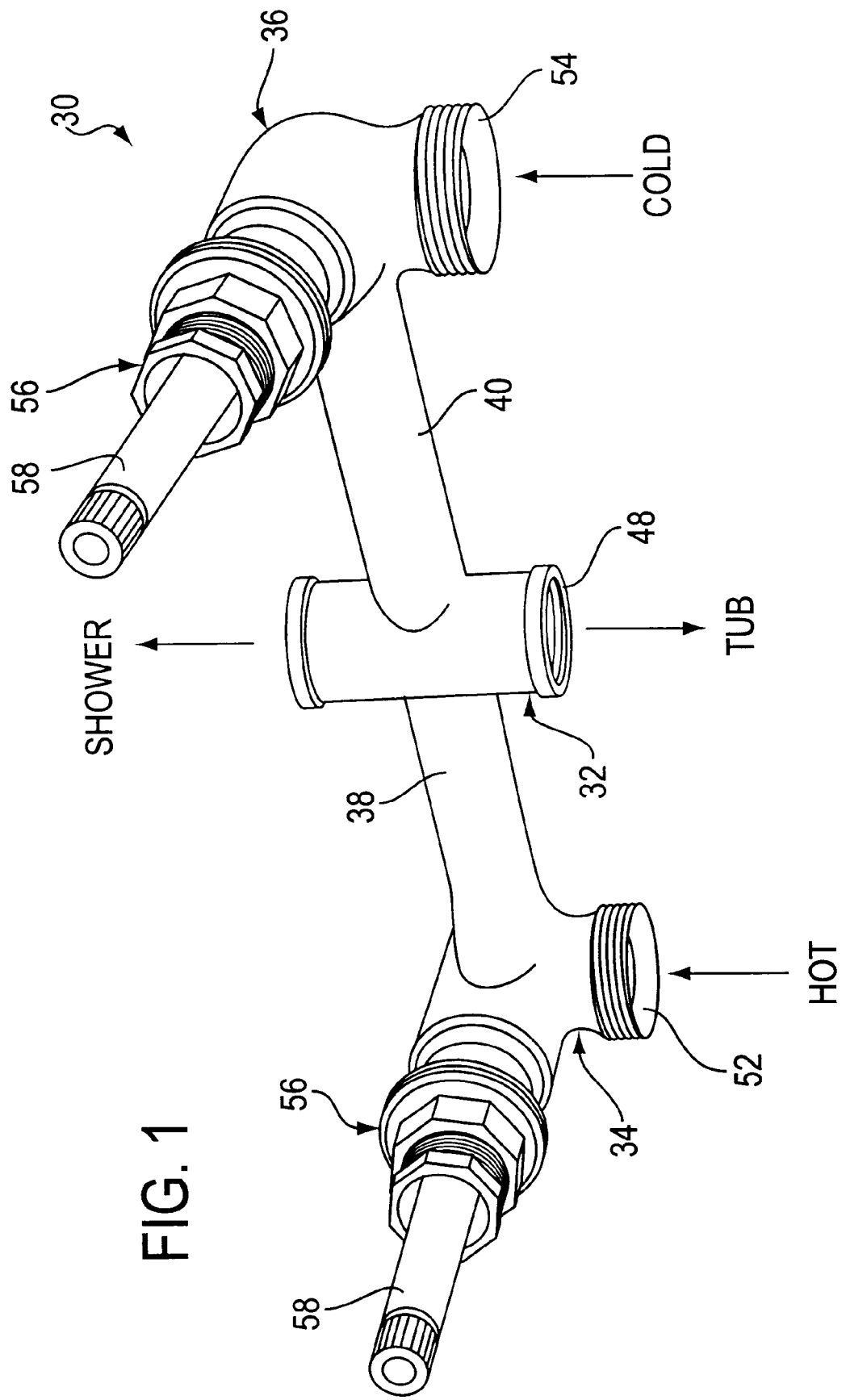
FIG. 1 is a perspective view showing an in-wall faucet body.
Figure 3:
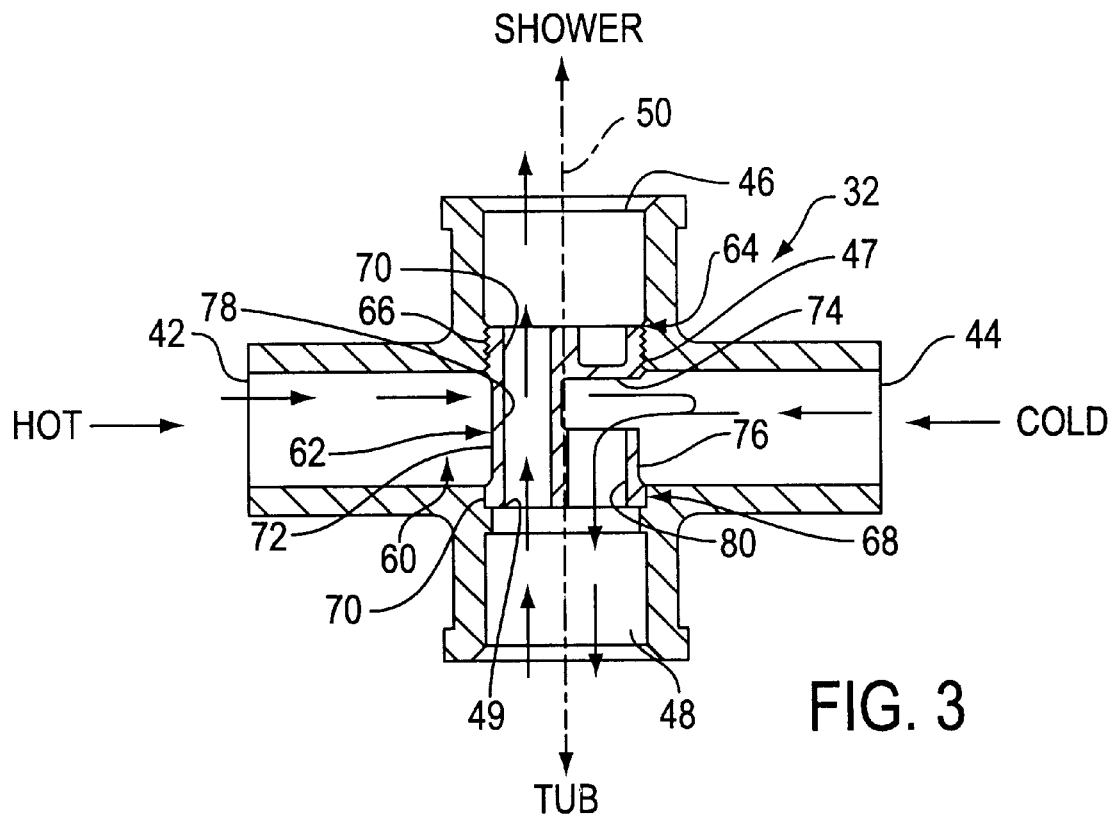
FIG. 3 is a sectional view showing the prior art ejector tee of FIG. 2 in assembly with a center body.
Figure 7A:
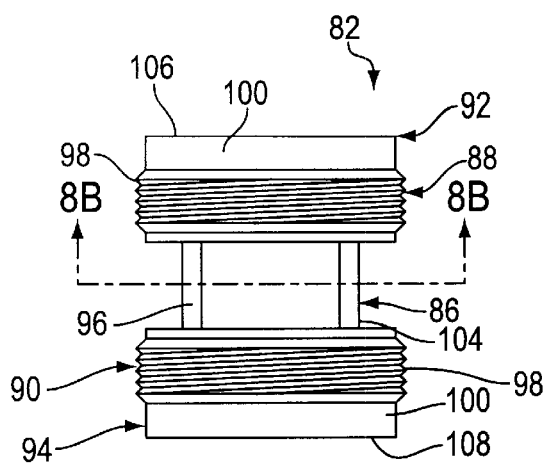
FIG. 7A is a front view showing the tee of FIG. 4 in accordance with certain principles of the invention.
Figure 7B:
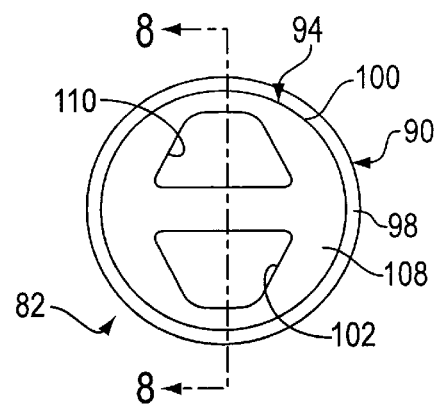
FIG. 7B is a first end view showing the tee of FIG. 4 in accordance with certain principles of the invention.
Figure 8:
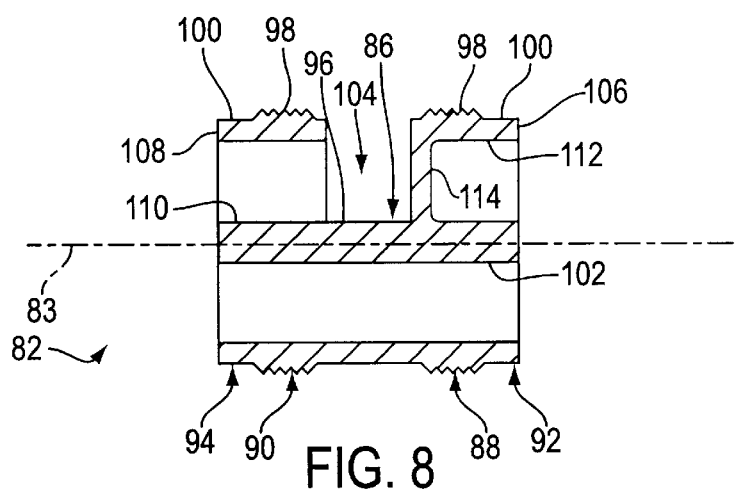
FIG. 8 is a sectional view, taken along line 8—8 of FIG. 7B, showing the tee of FIG. 4 in accordance with certain principles of the invention.
Figure 8A:
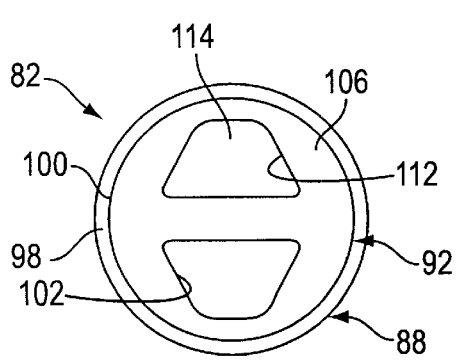
FIG. 8A is a second end view showing the tee of FIG. 4 in accordance with certain principles of the invention.
Figure 8B:
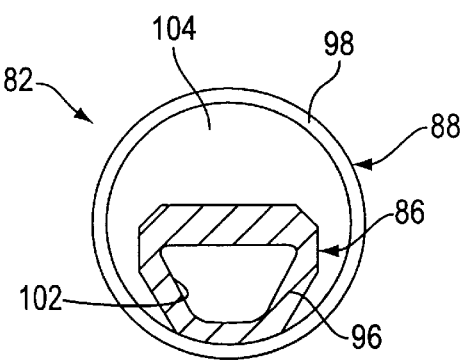
FIG. 8B is a sectional view taken along the line 8B—8B of FIG. 7A showing the tee of FIG. 4 in accordance with certain principles of the invention.

Referring to FIG. 1, a faucet body 30 is formed with a center body 32, a pair of end bodies 34 and 36, and a pair of linking conduits 38 and 40, all of which are formed as an integral casting. Referring to FIG. 3, the center body 32 is formed as a cross joint coupling with a first passage 42 and a spaced second passage 44 extending horizontally from a central point of the center body in opposite directions therefrom. A third passage 46 and a spaced fourth passage 48 extend in opposite directions from the central point of the center body 32 in alignment with an axis 50 of the center body at the top and bottom, respectively, thereof. An inboard portion of a wall formed by the third passage 46 is formed with threads 47, while an inboard portion of a wall formed by the fourth passage 48 is formed with a ledge 49.

As shown in FIG. 1, the end bodies 34 and 36 are formed with a first inlet port 52 which is connectable to a hot water supply line (not shown) and a second inlet port 54 which is connectable to a cold water supply line (not shown). Each of the end bodies 34 and 36 is also formed with a port which receives a valve 56 having a stem 58. The conduits 38 and 40 are interposed between the end bodies 34 and 36, respectively, and the center body 32. When either or both of the valves 56 are selectively adjusted to allow the entry of water into the respective end bodies 34 and 36 from the water supply conduits, the conduits 38 and 40 provide a passage for the water to flow from the end bodies to the center body 32. The water then flows from the center body 32, through the port 46, to a shower head (not shown) and, through the port 48 to a tub spout (not shown).

Figure 2:
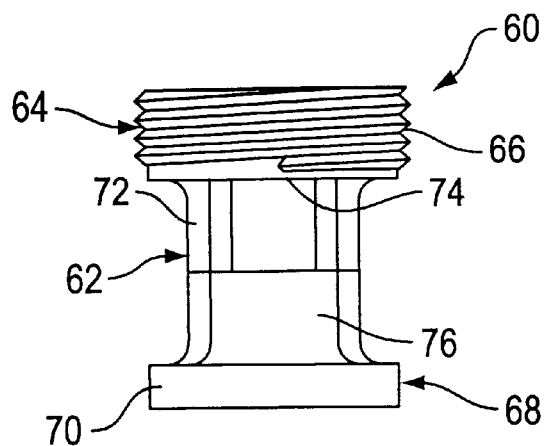
FIG. 2 is a front view showing a prior art ejector tee.

A diverter valve (not shown) is assembled within the tub spout and, when adjusted to a tub mode setting, allows water to flow from the center body 32 and through the tub spout, and tends to preclude the flow of water to the shower head. When the diverter valve is adjusted to a shower mode, water is allowed to flow from the center body 32 to the shower head, and the diverter valve precludes water from flowing through the tub spout. Even though the diverter valve tends to preclude the flow of water from the center body 32 to the shower head during the tub mode, occasionally some water gets through and leaks undesirably from the shower head. Referring to FIGS. 2 and 3, an ejector tee 60 was developed many years ago for assembly with the center body 32 (FIG. 3) to stem the leakage of water from the shower head during a tub mode of operation.

Referring to FIG. 2, the tee 60 is formed generally with a central section 62, an upper cylindrical section 64 having threads 66 formed on the periphery thereof, and a lower cylindrical section 68 having a smooth, or unthreaded, periphery 70. The central section 62 is formed with a post 72 which is formed integrally with, and between, the upper section 64 and the lower section 68, and which occupies only a portion of the space between the upper section 62 and the lower section 64. An upper portion of the remainder of the space between the upper section 62 and the lower section 64 is unoccupied and forms a window 74. A lower portion of the remainder of the space between the upper section 62 and the lower section 64 is occupied by a half-post 76 which is formed integrally with the lower cylindrical section 68.

Referring to FIG. 3, a first passage 78 is formed fully through the tee 60 in an axial direction but is offset laterally of, and parallel with, the axis 50. A second passage 80 is formed fully through the half-post 76 and the lower cylindrical section 68 and communicates with the window 74 at the top of the passage 80.

The tee 60 is assembled with the center body by first inserting the lower cylindrical section 68 into the open end of the passage 46. The tee 60 is moved into the passage 46 where the threads 66 of the tee engage and threadedly mesh with the threads 47 of the center body 32. As the tee 60 is being threadedly assembled within the passage 46, the lower cylindrical section 68 is moved through an intersection space formed at, and bordered by, the inboard ends of the passages 42, 44, 46 and 48. Eventually, the bottom of the lower cylindrical section 68 seats on the ledge 49 of the tee 60 to limit further movement of the tee toward the passage 48, and the central section 62 of the tee is located within the intersection space. The tee 60 is now fully assembled with the center body 32 as shown in FIG. 3.

Hot and cold water enters the passages 42 and 44, respectively, and, as indicated by the arrows, flows toward the intersection space where the tee 60 is located. The hot and cold water is mixed in the vicinity of the intersection space and tee 60 and passes through passage 80 of the tee and is directed toward the spout of the tub. If the diverter valve is in the tub mode, the water flows through the spout and into the tub. If the diverter valve is in the shower mode, the water flows through passage 80 of the tee 60 and is directed toward the diverter valve at the tub spout. However, since the diverter valve is in the shower mode, the water flow is reversed and now flows upward through passage 78 of the tee 60 and, eventually, from the shower head.

During the tub mode of operation, the water is directed downward through the passage 80 toward the tub spout which tends to preclude the water from travelling upward to the shower head. Also, because of the smaller diameter and the length of the passage 78, any pressure buildup between the tee 60 and the exit port of the tub spout is insufficient to force some of the water toward the shower head. Thus, the tee 60 eliminates the shower head leakage problem during the tub mode.

Due to circumstances which may exist at the installation site, the hot and cold water supply conduits could be directed upward from a floor level or, in the alternative, from an overhead location such as the ceiling. If the supply conduits are directed upward from a floor level, the faucet body 30 would be assembled in the orientation illustrated in FIG. 1. If the supply conduits are directed from an overhead location, the faucet body 30 would have to be inverted 180 degrees from the position shown in FIG. 1 in order to make the supply conduit connections with the inlets 52 and 54 of the body. With inversion of the faucet body 30 as described above, the ejector tee 60 is also inverted. When the water enters the center body 32, it will flow into passage 80 of the tee 60 which directs the water upward toward the shower head regardless of the mode, tub or shower, at which the diverter valve is set. Thus, the ejector tee 60 is useful only when the faucet body 30 is mounted in the orientation shown in FIG. 1.

Figure 9:
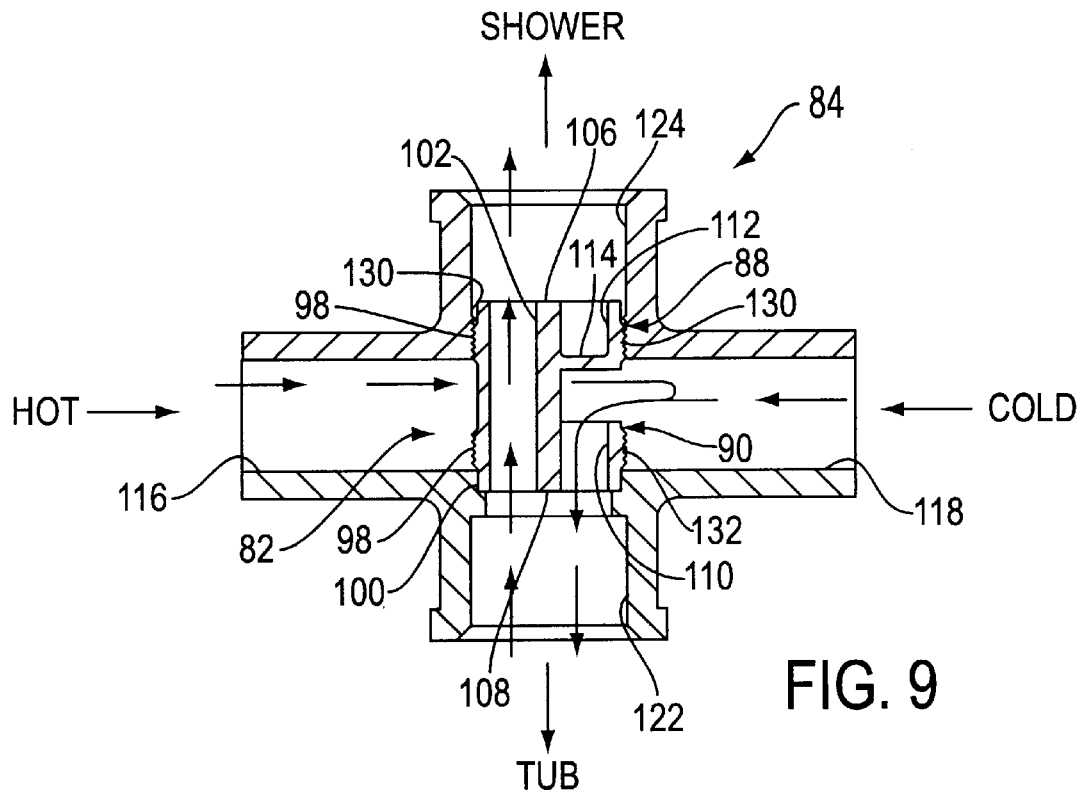
FIG. 9 is a sectional view showing the tee of FIG. 4 in assembly with a center body.

As a solution to this limited use of the tee 60, a reversible ejector tee 82 has been developed, as shown in FIGS. 4 through 8B, which can be assembled reversibly within a center body 84 (FIGS. 9 and 10) through a single passage 86 thereof. The tee 82 is one embodiment of a reversible ejector tee which can be used in place of the tee 60, and is composed of a plastic material such as, for example, a glass filled nylon.

The ejector tee 82 is formed generally and externally in the shape of the exterior of a cylinder about an axis 83 (FIG. 4) thereof. The tee 82 includes a central section 86, two intermediate sections 88 and 90 having inboard ends formed integrally with opposite ends of the central section, and two end sections 92 and 94, formed integrally with the outboard ends of the intermediate sections 88 and 90, respectively.

The central section 86 is formed with a post 96 which extends between inboard ends of the intermediate sections 88 and 90 in an axial direction, but is offset from and parallel with the axis 83. Each of the intermediate sections 88 and 90 are formed with threads 98 around the periphery thereof. The end sections 92 and 94 are circular and are each formed with a smooth peripheral surface 100. A shower passage 102 is formed in and through the tee 82 parallel to the axis 83 and is offset therefrom. It is noted that the passage 102 extends through the post 96, as well as the intermediate sections 88 and 90, and the end sections 92 and 94. A portion of a space between the inboard ends of the intermediate sections 88 and 90, which is not occupied by the post 96, is open and forms a passage or window 104, generally laterally of the axis 83.

The tee 82 is further formed with opposite end surfaces 106 and 108, which define the axial length of the tee. An entry passage 110 is formed through the intermediate section 90 and the end section 94, and is open at one end thereof located at the end surface 108 and communicates with the window 104 at the opposite end of the entry passage. A well-like opening 112 is formed in the tee 82 at the end surface 106 and includes a floor 114. Therefore, the opening 112 does not extend through the intermediate section 86 and is not in communication with the window 104. The passages 102 and 110, and the opening 112, are formed with the same cross-sectional shape, and are located in symmetrical fashion about the axis 83.

Figure 10:
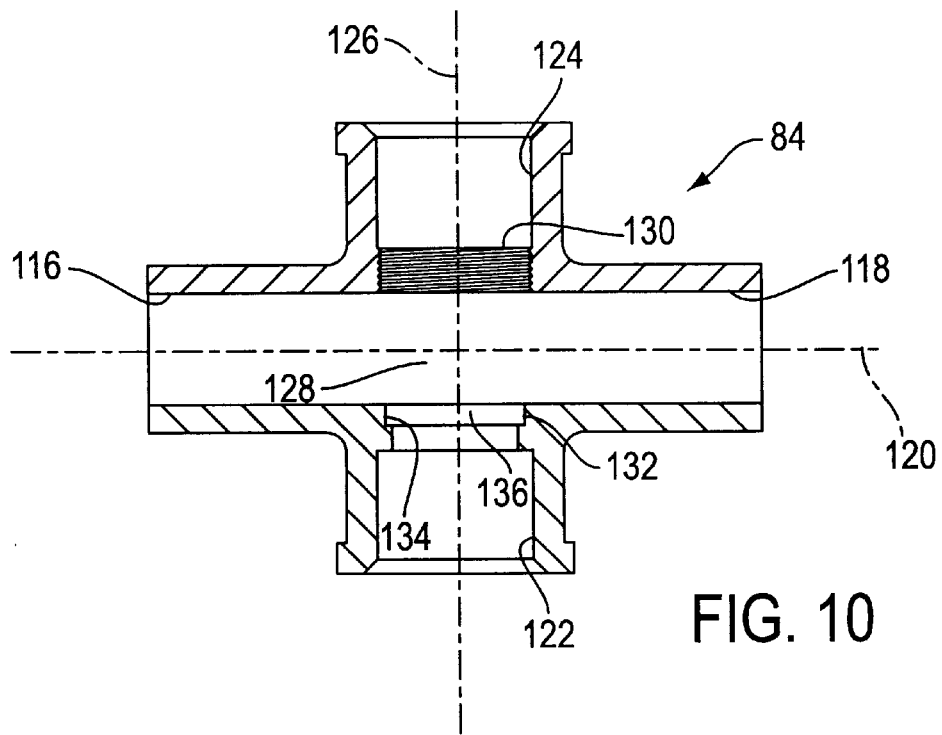
FIG. 10 is a sectional view showing the center body of FIG. 9.

Referring to FIG. 10, the center body 84 is formed with a hot water entry passage 116 and a cold water entry passage 118 which are formed about a horizontal axis 120. The center body 84 is also formed with a tub-outlet passage 122 and a shower-outlet passage 124 which are formed about a vertical axis 126. A chamber 128 is formed at the center of the center body 84, around the intersection of the axes 120 and 126, which is in communication with the four passages 116, 118, 122 and 124. A lower portion of a wall of the passage 124, adjacent the chamber 128, is formed with threads 130. A countersink or ledge 132 is formed an upper portion of a wall of the passage 122, adjacent the chamber 128.

When the center body 84 forms a portion of the faucet body 30 (FIG. 1), and the hot and cold water supply conduits extend upward from a floor level, the faucet body will assume an orientation as shown in FIG. 1. The tee 82 is then positioned so that the end surface 108 thereof is facing downward over the outboard opening of shower passage 124, and the tee is then inserted into the passage. Eventually. the threads 98 of the intermediate section 90 of the tee 82 reach the threads 130 of the center body 84 and the tee is rotated to provide meshing engagement between the threads.

Upon continued rotation of the tee 82, the threads 98 of the tee intermediate section 90 are moved past the center body threads 130 and into the chamber 128 of the center body 84. Eventually, the threads 98 of the tee intermediate section 88 reach the center body threads 130, and are threadedly enmeshed therewith as the tee continues to be rotated. Finally, edge portions of the end surface 108 of the tee 82 seats onto the ledge 132, which functions as a stop surface to properly locate the tee within the chamber 128 of the center body 84. Thus, the tee 82 is secured within the center body 84 in this manner, and is positioned to provide the appropriate control of the incoming water flow and to direct the water to the spout of the tub when the diverter valve is in the tub mode without leakage at the shower head.

If the water supply conduits extend from the overhead, and not from the floor level, the faucet body 30 will have to be inverted 180 degrees from the position shown in FIG. 1. In this inverted position, the passage 124 of the center body 84 is facing downward and the passage 122 is facing upward. If the tee 82 is allowed to remain assembled within the center body 84 in the orientation described above, the water-flow path through the tee will be affected to the extent that the water will essentially always flow in the direction of the shower head regardless of the mode selection of the diverter valve.

When the supply conduits extend from an overhead location, the faucet body 30 is inverted as noted above to accommodate the connection of the conduits to the faucet body. In this instance, the center body passage 124 is facing downward. The reversible ejector tee 82 is orientated so that the end surface 106 is facing upward, and the tee is then inserted into the passage 124 of the center body 84. As the tee 82 is inserted into the passage 124, the threads 98 of tee intermediate section 88 engage and mesh with the threads 130 of the center body 84, and are eventually moved past the threads 130 and into chamber 128 of the center body. As the tee 82 is inserted further into passage 124, the threads 98 of intermediate section 90 engage and mesh with the threads 130 of the center body 84. Eventually, edge portions of the end surface 106 move upward toward, and seat on, the ledge 132 of the center body 84 to preclude further upward movement of the tee 82. In this manner, the tee 82 is appropriately located and secured within the center body to effect the proper flow direction of the water depending on the selected mode of the diverter valve.

Thus, as described above, the versatility of the structure of the tee 82 provides for the use of a single tee regardless of the upward or downward orientation of the passage 124 of the center body 84.

In addition to the foregoing features of the tee 82, each of the end sections 92 and 94 thereof are formed with an axial height which is complementary to the axial depth of an opening 134 (FIG. 10) formed by a side wall 136 (FIG. 10) of the center body 84 which is contiguous with, and located between, the chamber 128 and the ledge 132. When the tee 82 is assembled with the center body, regardless of the assembly location of the supply conduits, the end sections 92 and 94 will fit snugly into the opening 134. With the threaded arrangement near one end section of the tee 82, and the snug fit at the opposite end section, the reversible ejector tee provides a structure which is firmly assembled within the center body 84, regardless of the orientation of the faucet body 30.

As noted above, the passages 102 and 110 of the tee 82, and the well-like opening 112 thereof, are formed with a common cross section, and are also located symmetrically about the axis 83. When assembling or disassembling the tee 82, the common cross section configuration allows for the use of a tool with a single prong having a shape complementary to the common cross section, or a tool with a double prong where each prong has a shape complementary to the common cross section. Other implements of a different shape could be used in place of the tools. For example, a flat-bit screw driver of selected width could be wedged into any of the passageways 102 or 110, or the opening 112, and manipulated to threadedly insert or remove the tee 82 relative to the center body 84.

Referring to FIGS. 11 through 14, a preferred embodiment of the invention is embodied in a reversible ejector tee 138 which has some structural features similar to those of the tee 82. Where the structural features of the tee 138 are essentially identical to those of the tee 82, the numerals used to identify the features of the tee 82, which are common to the tee 138, will also be used to identify the common features of the tee 138.

The tee 138 is formed about a central axis 140, and with a passage 142 which extends through the tee from the end surface 106 to the end surface 108. The passage 142 is parallel to and offset from the axis 140, and is formed in three communicating sections 144, 146 and 148. The section 144 of the passage 142 is a first end section which is contiguous with the end surface 106 and is formed generally in a common half-moon shape in an axial direction. The section 148 of the passage 142 is a second end section which is contiguous with the end surface 108 and is also formed generally in the common half moon shape in the axial direction. The section 146 of the passage 142 is a middle section thereof which is located between the end sections 144 and 148, and which is formed with a prescribed cross sectional shape different from the half moon shape of the end sections and smaller in width than the width of the end sections.

A well-like opening 150 with a floor 152 is formed in the end surface 106 and extends inward for a prescribed distance. The opening 150 is formed generally in the half moon shape in the manner of the end sections 144 and 148 of the passage 142, and is parallel with and offset from the axis 140. The end section 144 and the opening 150 are located symmetrically on opposite sides of the axis 140.

A passage 154 is formed through portions of the intermediate section 90 and the end section 94 of the tee 138, with a first opening of the passage being contiguous with the end surface 108 of the tee and a second opening, opposite the first opening, in communication with the window 104. The passage 154 is also formed generally in the half moon shape and is parallel with and offset from the axis 140. Further, the end section 148 of the passage 142 and the passage 154 are symmetrically arrange on opposite sides of the axis 140.

A first pair of shoulders 156 and 158 are formed laterally of the axis 140 in a plane where the end section 144 of the passage 142 joins the middle section 146 thereof. Also, a second pair of shoulders 160 and 162 are formed laterally of the axis 140 in a plane where the end section 144 of the passage 142 joins the middle section 146 thereof.

Figure 11:
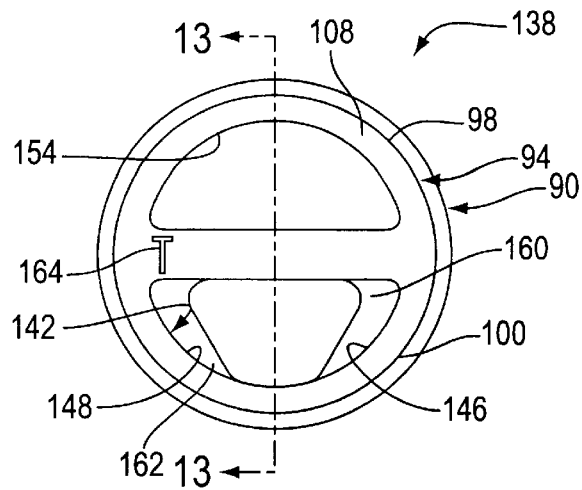
FIG. 11 is a first end view of a second embodiment of a reversible ejector tee in accordance with certain principles of the invention.
Figure 12:
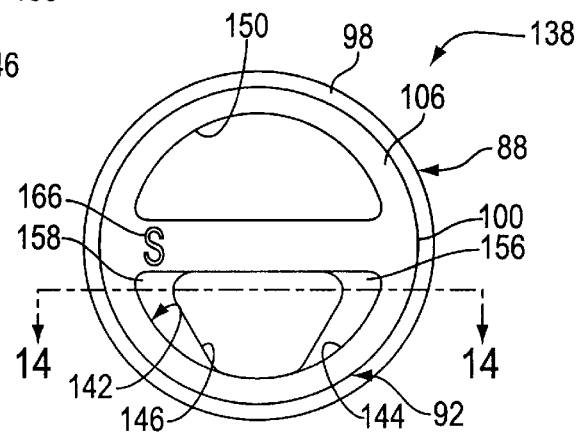
FIG. 12 is a second end view of the second embodiment of the reversible ejector tee of FIG. 11 in accordance with certain principles of the invention.
Figure 13:
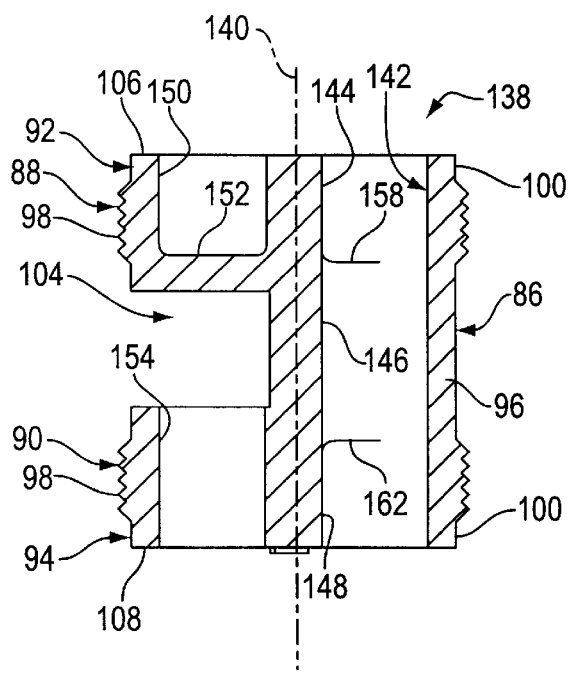
FIG. 13 is a sectional view of the tee of FIG. 11 showing internal features of the tee in accordance with certain principles of the invention.
Figure 14:
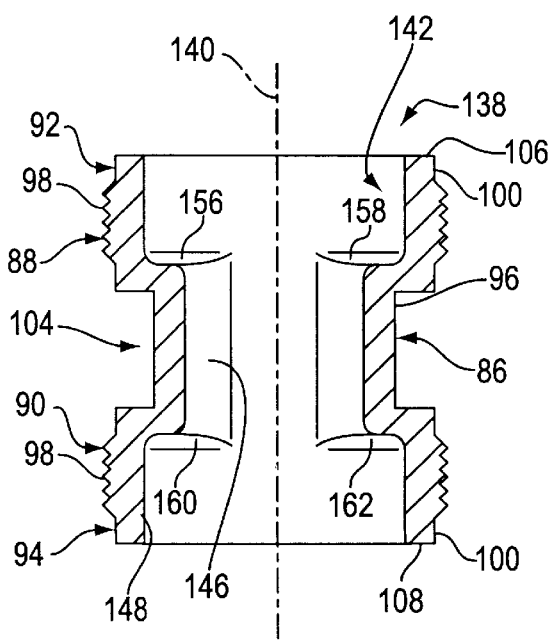
FIG. 14 is a sectional view of the tee of FIG. 11 showing internal features of the tee in accordance with certain principles of the invention.

A first embossment 164, in the shape of the letter "T," is formed on the end surface 108 of the tee 138 as shown in FIG. 11. A second embossment 166, in the shape of the letter "S," is formed on the end surface 106 of the tee 138 as shown in FIG. 12. When assembling the tee 138 with the center body 84, the "T" embossment 164 is oriented to face the direction in which water flows toward the tub, and the "S" embossment 166 is oriented to face the direction in which water flows toward the shower head. This is the proper orientation for the embossments 164 and 166, regardless of the orientation of the faucet body 30 to accommodate the supply conduits extending from the floor level or the overhead.

The structure of the preferred embodiment of the tee 138 provides a tee which generally has symmetrical wall thicknesses throughout the tee for uniformity in the construction of the tee 138. The half moon shape of the end sections 144 and 148 of the passage 142, and the opening 154, facilitate the manufacture of a lower cost tee 138 while maintaining the smaller middle section 146 of the passage 142. The shoulders 156, 158, 160 and 162 provide a seat for any tool which may be used to assemble or disassemble the tee 138 relative to its position with the center body 84. Further, the presence and location of the embossments 164 and 166 provide a guide for an installer to insure that the tee 138 is being assembled in the proper orientation.

In general, the above-identified embodiments are not to be construed as limiting the breadth of the present invention. Modifications, and other alternative constructions, will be apparent which are within the spirit and scope of the invention as defined in the appended claims.

What is claimed is:

1. A reversible ejector tee formed about an axis, which comprises:

a central section formed with opposite axial ends;

a pair of axially spaced fastening sections formed externally with fastening structure;

the central section integrally joined at the opposite axial ends thereof with inboard ends of the spaced pair of fastening sections a pair of axially spaced end sections formed integrally at inboard ends thereof with outboard ends of the fastening sections;

the outboard ends of the end sections forming outboard ends of the reversible ejector tee;

a first passage formed in an axial direction through the ejector tee offset from the axis in a first axially lateral direction;

a second passage formed in an axial direction through one of the pair of fastening sections and the adjoining end section and is offset from the axis in a second axially lateral direction;

the second passage having an entry end formed in the one fastening section; and a third passage formed laterally of the axis from the exterior of the tee and is in communication with the second passage through the entry end thereof.

2. The reversible ejector tee as set forth in claim 1, wherein the fastening structure is in the form of threads.

3. The reversible ejector tee as set forth in claim 1, wherein the tee is formed externally generally in the shape of a cylinder.

4. The reversible ejector tee as set forth in claim 1, wherein the first and second passages are formed with essentially the same cross section.

5. The reversible ejector tee as set forth in claim 1, which further comprises:

a cup-like well formed in the other of the pair of fastening sections in alignment with and spaced from the second passage;

the well formed with a floor; and the cross section of the well being essentially the same as the cross section of the first and second passages.

6. The reversible ejector tee as set forth in claim 1, wherein the pair of end sections are formed with a smooth periphery.

7. The reversible ejector tee as set forth in claim 1, wherein each of the end sections are circular in shape, formed at a same prescribed diameter and with a smooth peripheral surface.

8. The reversible ejector tee as set forth in claim 1, wherein the first passage further comprises:

a first end section contiguous with a first axial end surface of the tee, an intermediate section, a second end section contiguous with a second axial end surface of the tee opposite the first axial end surface; and the portion of the first passage formed by the intermediate section being smaller in transaxial size than either of the transaxial size of the first end section or the second end section.

9. The reversible ejector tee as set forth in claim 1, which further comprises:

at least one shoulder formed in the first passage laterally of the axis.

10. The reversible ejector tee as set forth in claim 1, which further comprises:

at least one embossment formed on the tee which provides indication of the proper orientation of the tee prior to assembly of the tee with a tee-receptor unit.

* * * * *